United States Patent [19]
Rossella et al.

[11] Patent Number: 6,088,338
[45] Date of Patent: Jul. 11, 2000

[54] METHOD AND SYSTEM FOR THE DETERMINATION OF THE PSCN PARAMETER STARTING FROM THE MFN PARAMETER IN A DECT CORDLESS TELEPHONE SYSTEM

[75] Inventors: De Benedittis Rossella, Barbaiana Di Lainate; Marnoni Luca, Saronno, both of Italy

[73] Assignees: Siemens Information and Communication Networks S.p.A.; Italtel SpA, both of Milan, Italy

[21] Appl. No.: 08/945,025

[22] PCT Filed: Mar. 29, 1996

[86] PCT No.: PCT/EP96/01436

§ 371 Date: Oct. 21, 1997

§ 102(e) Date: Oct. 21, 1997

[87] PCT Pub. No.: WO96/33560

PCT Pub. Date: Oct. 24, 1996

[30] Foreign Application Priority Data

Apr. 21, 1995 [IT] Italy ................. MI95A0809

[51] Int. Cl.[7] ............... H04L 5/14; H04B 7/212; H04B 7/00; H04Q 7/20
[52] U.S. Cl. ............ 370/294; 370/347; 455/464; 455/515; 455/560
[58] Field of Search ................. 370/347, 294, 370/337, 442, 332; 455/62, 462, 464, 465, 12.1, 524, 555, 560, 434, 515

[56] References Cited

U.S. PATENT DOCUMENTS

| | | | |
|---|---|---|---|
| 5,226,045 | 7/1993 | Chuang | 370/332 |
| 5,371,783 | 12/1994 | Rose et al. | 455/464 |
| 5,636,243 | 6/1997 | Tanaka | 375/219 |
| 5,870,673 | 2/1999 | Haartsen | 455/426 |
| 5,959,984 | 9/1999 | Dent | 370/347 |

FOREIGN PATENT DOCUMENTS

| | | |
|---|---|---|
| 9219982 | 11/1992 | Australia . |
| 0486089A | 5/1992 | European Pat. Off. . |
| 0637144A | 2/1995 | European Pat. Off. . |
| 0214967 | 3/1994 | Germany . |

*Primary Examiner*—Alpus H. Hsu
*Assistant Examiner*—Afsar M. Qureshi

[57] ABSTRACT

A method and a system to obtain the Primary Receiver Scan Carrier Number (PSCN) starting from the data regarding the multiframe number (MFN) in a personal telephone system realized according to the DECT standard. The following steps are present calculating the minimum common multiple (m.c.m.) between the duration of a multiframe (160 ms) and the period necessary for the complete scanning of the frequencies by a radio fixed part (RFP); dividing this minimum common multiple (m.c.m.) by the duration of a multiframe and taking the quotient to obtain a periodicity value; waiting that the multiframe number (MFN) assumes a whole multiple value of the periodicity calculated as indicated above and beginning and the scanning starting from the known frequency (x) which is common to all fixed radio parts (FRP) to be synchronized.

12 Claims, 4 Drawing Sheets

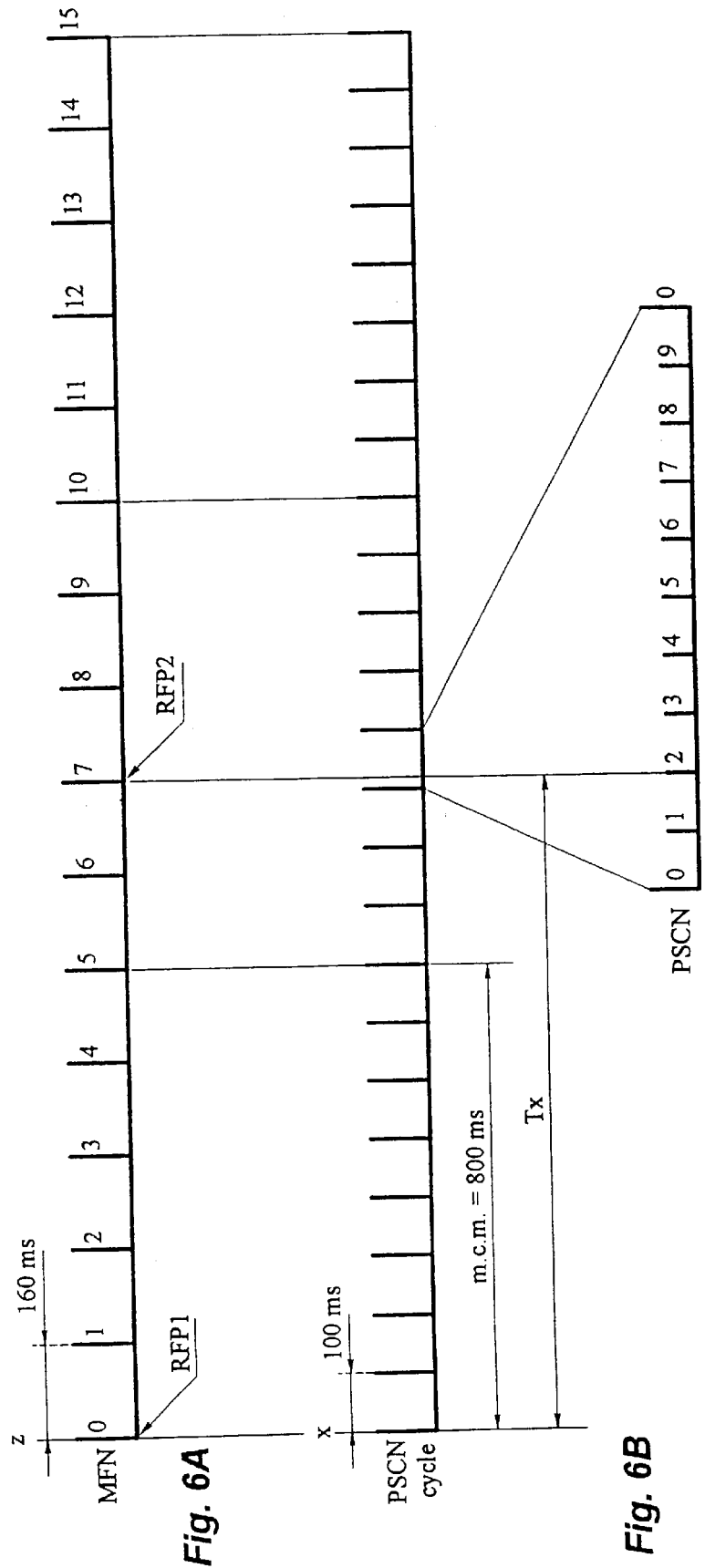

METHOD AND SYSTEM FOR THE DETERMINATION OF THE PSCN PARAMETER STARTING FROM THE MFN PARAMETER IN A DECT CORDLESS TELEPHONE SYSTEM

FIELD OF THE INVENTION

The present invention relates to a personal telephone system, suitable for the transmission and reception of digital signals between mobile sets, and fixed stations in a cordless system.

In particular the invention finds its preferred but not restrictive application in the DECT system (Digital European Cordless Telecommunications) which constitutes a European standard for radio telecommunication systems of the cordless type which is suitable to offer phone and data services.

Personal telephone systems include a plurality of fixed transceiver radio stations to cover the interested areas and connected to a switching network which may be a public one or a private switching system (PABX), and portable user equipment which establish the connection with fixed base stations via radio. These systems are therefore suitable to communicate with each other and residential users connected to the telephone network. The connections may be of a voice type or can enable the exchange of data occupying the equivalent of one or more voice "channels".

A typical DECT network structure is schematically illustrated, as an example, in FIG. 1 and includes groups of k (in the example of the figure k=4) fixed transceiver radio stations—labelled in the DECT standard Radio Fixed Parts RFP—connected to branches (in the example 3 branches) set up by connecting lines L through drop-insert devices Dl. Each radio fixed part (RFP) can manage, via radio, a predetermined number of users—labelled in the DECT standard Portable Parts (PPs)—which are generally mobile. The branches are connected to a set of transcoders TRAS, and the latter one is connected to the public network PSTN (Public Switching Telephone Network) through a central control fixed part CCFP. In some applications the functions carried out by the CCFP may be inserted in a user card of a switching exchange or of a PABX.

The interface between the CCFP and the DECT network, for what is regarded the voice signal, is typically set up by digital channels of 64 Kbit/s (8000 samples/sec. each one codified through 8 bits). As specified above, to the CCFP unit a set of transcoders TRAS is connected which provides for the conversion of the eight bits PCM coding, used on the PSTN side, in an ADPCM (Adaptive Differential Pulse Code Modulation) four bits coding, used on the DECT side. The line L (bidirectional) at 2.048 Mbit/s which connects the CCFP to the different radio fixed parts RFP supports therefore 48 voice channels plus a prefixed number of synchronism and signalling channels.

The area covered by a fixed radio part, labelled cell, is in general quite reduced, sometimes reaching just a coverage with a radius of tenths or hundreds of meters. Typical applications of personal telephone systems are in industrial plants where they may replace the installation of a cable network, in commercial units or urban centres where they may replace for example, the public telephone boxes, which is an advantage.

The network for said personal telephone systems is a digital type. The radio access being of the category FDMA - TDMA - TDD.

The system is of the TDD type (Time Division Duplex) as the transmission and the reception do not take place at the same time. More precisely, as illustrated with reference to FIG. 2, the basic frame of 10 ms is divided into two halves: usually during the first 5 ms the radio fixed part transmits and the portable parts receive (half frame TX DECT for the radio fixed part and RX DECT for the portable parts), and during the following 5 ms the opposite happens. Each half frame is subdivided in 12 time channels or time slots (and therefore the system is of the TDMA type), each one of which is set up by 420 (or in certain cases 424) bits. The time slots are transmitted or received using 10, or more different frequencies. Therefore the system is of the FDMA type, for a total of 120 (or more) available channels which are allocated in order so as not to create interference problems.

The DECT system foresees logical channels among which a channel labelled channel "Q". This is a channel of the broadcast type, by which the fixed part of the system (FP) supplies the portable parts useful information about the system. This channel emits each time, different information which is repeated in a cyclic way.

As illustrated in FIG. 3A, the transmission of the channel Q takes place only in frame 8 of each multiframe. Among the information transmitted on this channel there are those which make it possible for the FP and the PP to act in a synchronous way on the air interface called Common Interface (Cl).

Part of the information, called Multi Frame Number (MFN), is suitable to guarantee that the Radio Fixed Part (RFP) and the portable parts (PP) are aligned regarding the multi frame information. The Multi Frame Number (MFN) in the DECT system is set up by 24 bits and is used to support the encryption procedure of a connection in order to assure the discretion of the transmitted information. In the DECT standard encryption algorithm such multi frame number is used, in an already known way and therefore no further description is set forth here, together with the frame number and a secret cipher key (CK).

As already known, a radio fixed part (RFP) scans subsequently the frequencies of the carriers supported by it in order to monitor possible link requests of the portable parts. This scanning takes place at the rate of one frequency per frame, i.e. the radio fixed part remains synchronized on a given frequency for the entire duration of a reception half frame end, in the following frame, it remains synthesized on another frequency, and so on. The frequencies in the DECT field are conventionally numbered from 0 to N-1 starting from the highest one in the transmission spectre, where N indicates the number of the supported frequencies.

Moreover, on the Q channel, further information is transmitted, the so-called number of the carrier scanned by the receiver PSCN (Primary Receiver Scan Carrier Number), which enables the PP to know the under scanning carrier on which the radio fixed part will be synchronized in the following frame. This information is set up by a number of 6 bits which typically indicates in decimal values from 0 to 9 in the case of 10 supported frequencies.

The two informations set up by the MFN and by the PSCN do not necessarily have to be transmitted during each multiframe of 160 ms, and the two parameters are in fact transmitted in messages forwarded at different times in the channel Q, although such information has to arrive with a certain reasonable periodicity at the portable parts. In particular the standard DECT foresees for both parameters MFN and PSCN a minimum transmission frequency of 8 multiframes, i.e. about a maximum time between two transmissions of each parameter of no more than 8*160 ms. The situation is schematically illustrated in FIG. 3B.

The availability in a non-continuous form of the parameter MFN involves extensions of the set up procedure at the beginning of a communication as the portable part has to wait, after the acquisition of the MFN parameter, a period within 1 and 7 multiframes to know when to start the transmission with the certainty that :he radio fixed part will be able to detect its transmission.

Analogously the availability in a non-continuous way of the parameter PSCN involves further delays in case of connections requiring encryption (with consequent PP necessity to acquire the MFN parameter) which constitutes a significant fraction of the exchanged traffic.

The problem of the delay on the acquisition periods of the PP useful information turns out to be even worse under handover conditions, and in particular under the so-called "external handover". As already known, when portable parts transit from one cell to the adjacent one, a procedure is carried out which directs a connection under progress on a physical channel towards another physical channel. This procedure is necessary in order to maintain continuously a communication and with the maximum possible quality level in case of movements of the mobile user or of variations of the surrounding radio conditions.

The DECT standard foresees a handover with channel changing (understood as slot/frequency couple), so-called of the hard type, carried out without any interruption (seamless) and under the direct control of the mobile unit, to which belongs the decision to activate this procedure. The handover is moreover of the forward type as all signalling necessary for this transition on the new radio channel set up in parallel to the old radio channel. The handover procedures foresee the connection change of the lower level maintaining the connections of the higher level. This makes it possible to assure different types of handover, with different performances. In particular the external handover is the switching process of a call by a DECT system to another, independent from the first one (for example between two RFPs belonging to different DECT systems, but with cells which are partially overlaid, see FIG. 4), among which the synchronism in principle is not assured to Cl, and in particular the alignment of the MFN and PSCN parameters.

Considering that, as referred before, the standard DECT foresees the transmission of the multiframe number MFN and of the primary receiver scan carrier number PSCN, the operator of such type of system must assure the synchrony of these two centralized references (PSCN and MFN), moreover with rather pressing technical needs which are achievable by expensive synchronization techniques, for example of the satellite type.

BACKGROUND ART

EP 637 144 patent application discloses a two-way communication method between portable parts PP and radio fixed parts RFP through repeater devices REP in a cordless DECT system wherein the transmission and the reception take place in FDMA, TDMA and TDD modality. In particular, the repeater REP is adapted to relay a connection between a portable part PP and a radio fixed part RFP within the half frame interval: the information received from the PP (RFP) onto the X slot is transferred to the RFP (PP) onto the Y slot, where slots X and Y belong to the same half frame and time slot Y occurs after time slot X. This patent application does not disclose or suggest the method of the present invention, i.e. a method for the acquisition of the information of the primary receiver scan carrier number or PSCN starting from the multiframe number or MFN in a time division multiple access or TDMA personal telephone system.

OBJECTS OF THE INVENTION

An object of the present invention is to attenuate the synchrony problems that the operator has to assure.

A further object of the present invention is that to minimize the necessary time to carry out an "external handover" procedure (reducing as a consequence the noises noticed by the user) and generally to minimize the waiting periods due to the necessity to receive the two above-mentioned informations PSCN and MFN which, as referred before, could also be received in cycles which follow each other every 8*160 ms.

DISCLOSURE OF THE INVENTION

The above mentioned objects are achieved through the present invention which relates to a method for the acquisition of the information of the primary receiver scan carrier number or PSCN starting from the multiframe number or MFN in a time division multiple access or TDMA personal telephone system, PSCN being the number of carrier, of the assigned ones, the radio fixed part shall scan in the next frame, and MFN being the number of the current multiframe of the TDMA personal telephone system, such system, being of type in which:

at least two radio fixed parts are connected to at least one communication network through at least one central control fixed part and to portable parts via radio;

each radio fixed part explores subsequently the frequencies of the supported carriers in research of possible connection requests by the portable parts;

said at least one central control fixed part transmits to all radio fixed parts 5 the above-mentioned multiframe number, wherein it comprises the following steps:

defining for all radio fixed parts the initial value of said multiframe number MFN and the corresponding scanning start frequency;

defining for all radio fixed parts the number N of the supported frequencies;

deducting in each radio fixed part the above-mentioned primary receiver scan carrier number parameter from the above-mentioned multiframe number parameter received by said at least one central control fixed part and starting the radio scanning of the frequencies beginning from the above-said scanning start frequency and going on from frame to frame in growing sequence.

According to a further aspect, the invention relates also to a personal telephone system suitable to acquire the number of carriers scanned by the receiver in the next TDMA frame or "primary receiver scan carrier number" starting from the running DECT multiframe number or "multiframe number" in a personal DECT telephone system comprising at least one radio fixed part connected to at least one switching network through at least one central control fixed part and connected via radio to portable parts. The radio fixed part explores subsequently the frequencies of the supported carriers in research for possible connection requests by the portable parts, and in which said at least one central control fixed part transmits to all radio fixed parts the multiframe number, characterized in that it comprises means suitable to:

transmit to all radio fixed parts the initial value of said multiframe number and the corresponding scanning start frequency;

define for all radio fixed parts the number of the supported frequencies;

deduct in at least one said radio fixed part the above-mentioned primary receiver scan carrier number from the above-said information of multiframe number and begin the scanning of the frequencies starting from the above-mentioned scanning start frequency and go on from frame to frame in a growing sequence.

Considering that the invention is adapted in a way to allow the deduction of the parameter PSCN from the parameter MFN, the advantages, that the invention makes possible to achieve, are evident.

A first advantage is the fact that the system operator has just to guarantee the synchrony of the parameter MFN.

If the MFN parameter is then obtained locking it to an absolute reference (which may be for example the national reference clock or a time reference distributed through a satellite system), the present invention makes it possible to synchronize in air—as well for what concerns the parameter MFN as for what concerns the parameter PSCN—several RFP stations belonging to different systems and/or operators.

Further advantages are in the reduction of the periods necessary to carry out the "external handover" procedures and broadly speaking to speed up the functioning of the radio fixed parts RFP as well as of the portable parts PP.

BRIEF DESCRIPTION OF THE DRAWINGS

The features of the present invention are set forth with particularity in the context claimed. The invention, together with further objects and advantages thereof, may be understood with reference to the following description, taken in conjunction with the accompanying drawings, and in which:

FIGS. 6A and 6B illustrate the link between the parameters MFN and PSCN according to a preferred form of implementation of the method at the basis of the present invention.

DETAILED DESCRIPTION OF THE PREFERRED EMBODIMENT OF THE INVENTION

Figure 1:
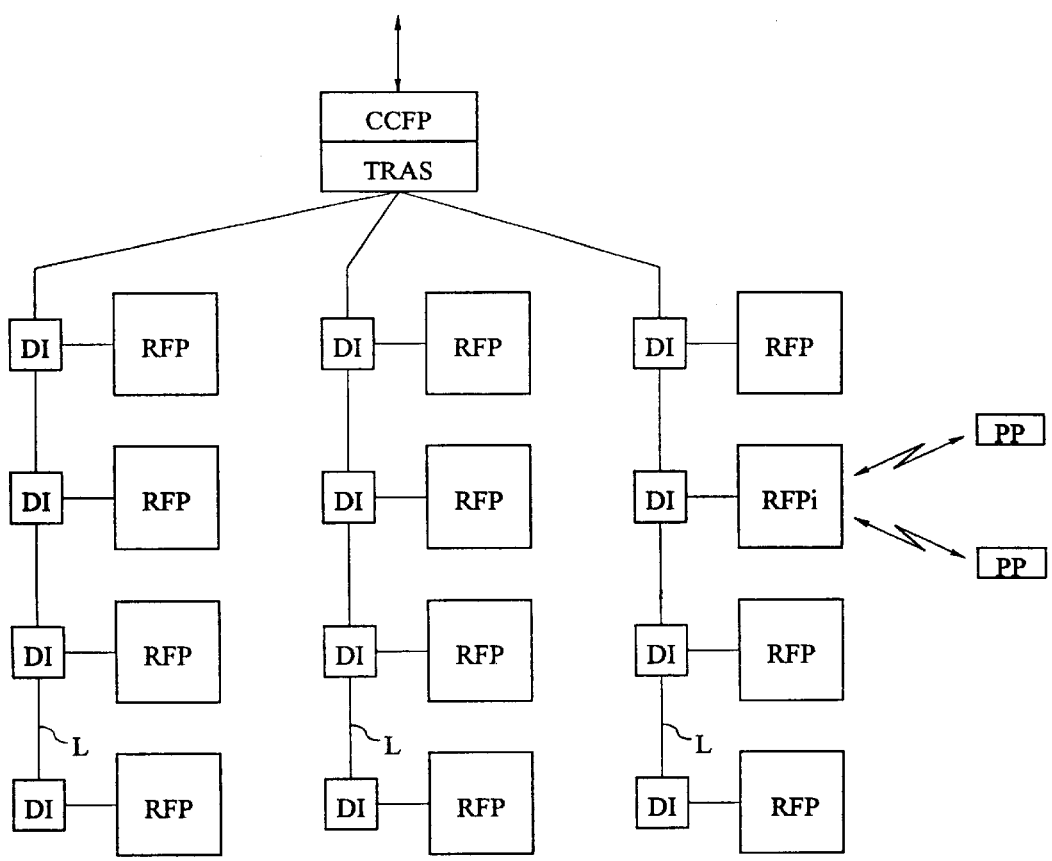
FIG. 1, already described, is a general scheme showing the structure of a cordless system of the DECT type.
Figure 2:
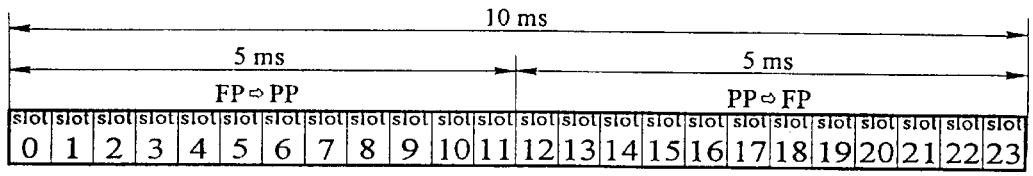
FIG. 2, already described, shows the organization of the DECT multiframe.
Figure 3A:
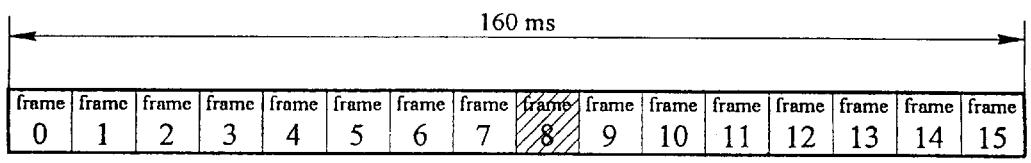
FIG. 3A, already described, shows the organization of the DECT multiframe.
Figure 3B:
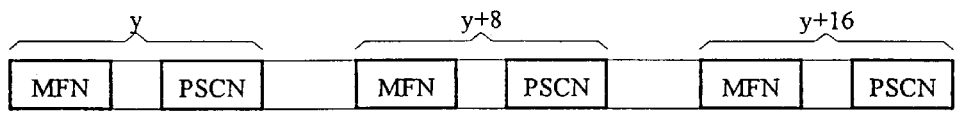
FIG. 3B, already described, illustrates the transmission of the parameters MFN and PSCN.
Figure 4:
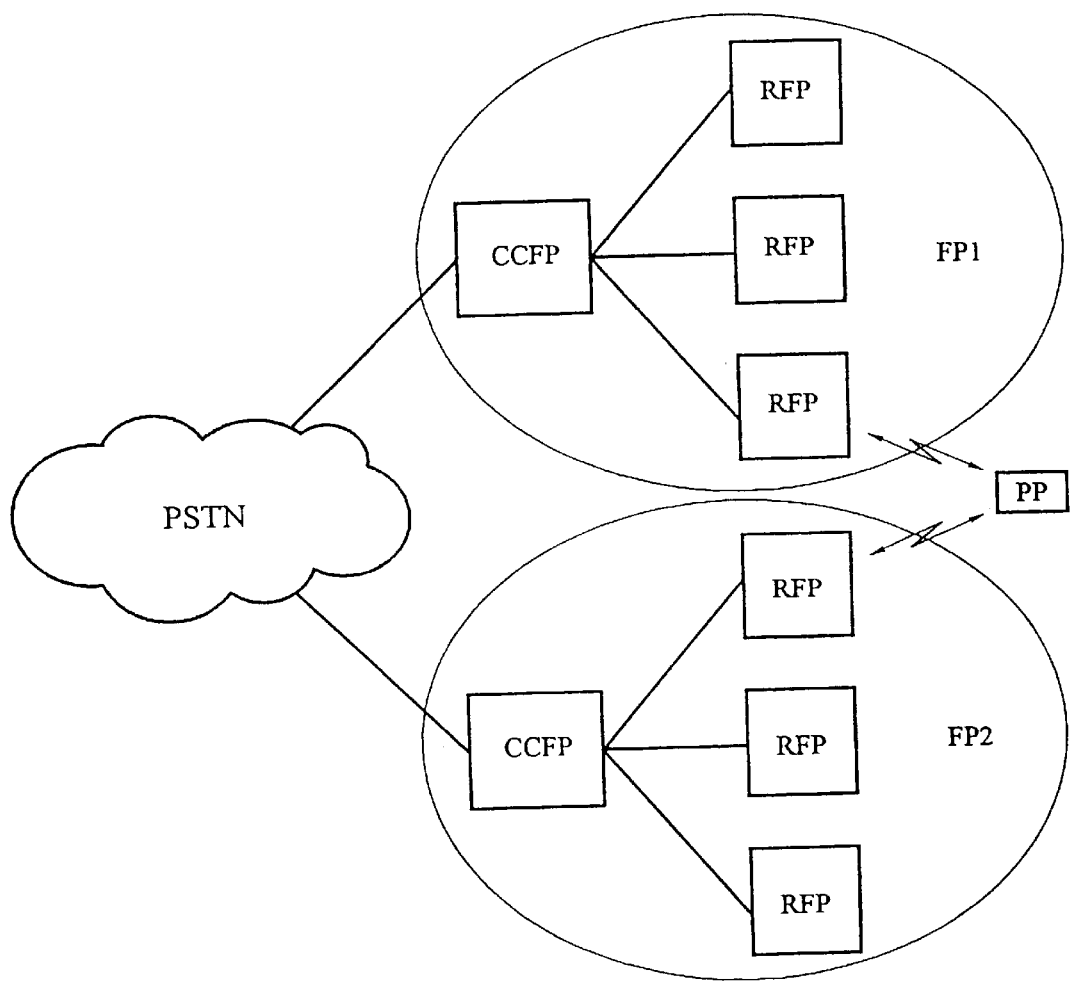
FIG. 4, already described, illustrates a scenario of an external handover.
Figure 5:
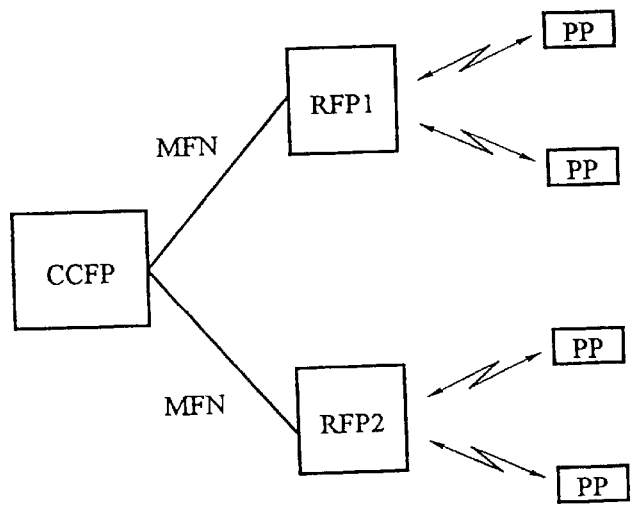
FIG. 5 is a partial scheme of a DECT system which illustrates the functions of the invention.

With reference to the FIGS. 5 and 6 a simplified application system of the invention is illustrated relative to two radio fixed stations RFP1 and RFP2.

FIG. 6A shows the course in time of the number MFN transmitted by the centre CCFP to the first RFP station started to work, and FIG. 6B shows the course in time of the number PSCN generated by said radio fixed part, supposing that 10 carrier frequencies are assigned to the system.

Assume that RFP1 is the first radio fixed part going into service, in an absolute sense within a given DECT system.

This first station receives from the centre CCFP an MFN value for example equal to zero (see FIG. 6A) and starts at its turn to scan the assigned frequencies (10 in the illustrated example) beginning from the frequency number zero, i.e. the highest one (FIG. 6B).

The other fixed stations of the system which subsequently start functioning have to synchronize on these two parameters PSCN and MFN such to transmit in air the same information.

When, after a period Tx equal to about 1.020 seconds in the illustrated example, the second station RFP2 starts to work, to this one the two above mentioned parameters have to be communicated, i.e. the MFN which increases by one unit each 160 ms with modulo - $2^{24}$ and the PSCN which increases by one unit every 10 ms with modulo N, where N is the number of supported frequencies (in the example 10), i.e. returning to the value 0 after the value N-1.

According to the invention the CCFP transmits to the station RFP2 only the MFN. All RFPs of the same system know the MFN value assigned by the centre to the first activated RFP (indicated by Z, in the example 0), and the first frequency which this station scans (indicated by X in the example 0). The invention foresees moreover that the parameter MFN which the CCFP transmits to the RFPs will be expressed as modulo of the minimum common multiple between $2^{24}$ and N.

In other words, according to a first embodiment of the present invention, the station RFP2, having received from CCFP the parameter MFN, calculates the minimum common multiple between the duration of the multiframe (160 ms) and the period which is necessary for a complete scanning of the frequencies by the RFP, equal to 10 ms multiplied by the number N of the frequencies assigned to the RFP, i.e. in the illustrated case 100 ms.

This m.c.m equal to 800 ms in the illustrated case is divided by the duration of the multiframe obtaining the value, equal to 5 in the illustrated case, which indicates the periodicity of the parameter MFN, that is the number of multiframes M—counted starting from the multiframe number z assigned by the centre to the first activated RFP—once these are over the first activated station, RFP1, starts again scanning the radio environment starting from the frequency 0 (in general from frequency X).

Therefore normalizing at the frame period (10 ms) we get:

$$M = \frac{m.c.m.(N, 16)}{16} = \frac{N}{M.C.D.(N10, 16)}$$

where m.c.m. (N, 16) indicates the minimum common multiple of N and 16, and M.C.D. indicates the maximum common divisor of N and 16.

RFP2 begins in this way to scan the radio environment starting from the frequency 0 and continuing frame by frame in the growing order, after that the multiframe parameter received from centre has assumed a value equal to a whole multiple of M. More in particular with the received data, the station RFP2 calculates the following MFN value in which there will be the coincidence (which is equal to 10 in the mentioned case) between the multiframe number and the scanning by the RFP1 of the frequency 0.

The procedure previously described in a simplified implementation may be generalized at the cost of a major implementation complexity in the following way:

since all stations belonging to the same system know the initial MFN value z and the corresponding frequency x of the scanning start, being N the supported frequency number, and as the centre transmits the parameter MFN expressed as modulo of m.c.m. between $2^{24}$ and N, it will calculate the following ratio:

$$160 * (MFN-Z/(10 * N)$$

The value of the first decimal figure resulting R added to x will indicate the radio frequency R+x that the RFP must start scanning and the PSCN value possibly to be transmitted into the current frame will be R+x+1.

According to the generalized procedure, the RFPs may in this way at the reception of the MFN parameter immediately start the radio activity in a synchronous way with all other RFPs belonging to the same DECT system.

According to the above, it is evident that as the RFPs receives only the MFN parameter, the system operator will just have to assure the synchrony of the MFN parameter. In the already known systems on the contrary the operator has to guarantee the synchrony of the parameter PSCN as well as that of the parameter MFN with a significant cost increase.

In addition to that, if the method at the base of the present invention is also applied to the PP units, it is possible to obtain further advantages since the PP which receives through the channel Q the MFN information transmitted by a RFP, it will be able to deduct the value of the PSCN parameter without being obliged to wait for its reception and exploiting also the property that these parameters appear only at frame 8 (dedicated to the system information) of a multiframe.

From studies carried out, it turns out that, since the PP can obtain the parameter PSCN from the MFN, the number N of the frequencies subjected to s scanning has to be a sub-multiple of $2^{24}$.

The saving in the acquisition time of the frequency value scanned by the receiver in the PP, turns out especially advantageous in the course of an "external handover" procedure.

The procedure is initiated by the portable part (but it may be suggested to this one by the RFP) when it warns that the transmission quality (level of the received power and/or reception errors noticed on the different fields) is degrading. This is possible as each terminal handling an active communication carries out cyclically the scanning of all other channels recording in an appropriate table the free channels, those occupied and those interfered, and recording also the RFPs with higher power than the present one. When the terminal warns that the quality level of the active communication is degrading, it carries out, in parallel to the already established traffic channel, a set-up on the channel with better quality (maintaining contemporaneously the original channel/bearer).

Therefore, according to the invention, the parameter PSCN links up univocally with the parameter MFN correlating the period of a multiframe ms) to the time which needs the RFP to complete a whole cycle of radio scanning.

The invention achieves the following advantages

First, it makes it possible to guarantee the synchrony of the two parameters MFN and PSCN among several radio fixed parts RFP belonging to the same fixed part FP;

to different fixed parts FPs, in case the parameter MFN has been obtained from can absolute reference (i.e. a satellite reference, e.g. of the global positioning system GPS type) known to the systems.

The above in order to obtain the synchrony of different radio fixed parts RFPs with the transmission of just the MFN parameter to the above-mentioned RFPs from the center.

The invention also allows a speed-up, the portable parts PP acquisition of the parameter PSCN necessary to realize a connection towards a given RFP, and in particular to optimize the handover (external handover), being the terminal able to deduct the value of this parameter from the reception of the first message Q which carries the information MFN or PSCN.

The possibility to deduct the parameter PSCN from the parameter MFN makes it therefore possible for the PP to save, in terms of acquisition time, a minimum of 1 multiframe and a maximum of 7 multiframes.

Although a particular embodiment of the present invention has been shown and described, it should be understood that the present invention is not limited thereto since other embodiments may be made by those skilled in the art without departing from the scope thereof. It is thus contemplated that the present invention encompasses any and all such embodiments covered by the following claims.

What is claimed is:

1. A method for the acquisition of the information of the primary receiver scan carrier number or PSCN starting from the multiframe number or MFN in a time division multiple access or TDMA personal telephone system, comprising:

defining for all radio fixed parts (RFP) the initial value of said multiframe number MFN and the corresponding scanning start frequency (x);

defining for all radio fixed parts (RFP) the number N of the supported frequencies;

deducing in each radio fixed part (RFP) said primary receiver scan carrier number (PSCN) parameter from said multiframe number (MFN) parameter received by said at least one central control fixed part (CCFP), and starting the radio scanning of the frequencies beginning from said scanning start frequency (x) and going on from frame to frame in growing sequence.

2. The method according to claim 1, wherein said at least one central control fixed part (CCFP) supplies to said radio fixed parts (RFP) said multiframe number (MFN) information expressed as modulo of the minimum common multiple between $2^{24}$ and N.

3. The method according to claim 1, wherein said number N of the supported frequencies and subject of scanning is a sub-modulo of $2^{24}$ and includes further the phase to deduct in each portable part (PP) said information of the primary receiver scan carrier number (PSCN) from said Multiframe number (MFN) information received by at least one central control fixed part (CCFP).

4. The method according to claims 1 or 3, wherein said phase of deducting in each radio fixed part (RFP) and/or in each portable part, (PP) said primary receiver scan carrier number (PSCN) from said multiframe number (MFN) information received from said at least one central control fixed part (CCFP) further comprising:

calculating the minimum common multiple between the duration of said multiframe (160 ms) and the period which is necessary for a complete scanning of the frequencies by the radio fixed part (RFP);

dividing this minimum common multiple for the duration of one multiframe to obtain a periodicity value;

awaiting that the multiframe number (MFN) assumes a whole multiple value of the periodicity calculated as indicated in the previous step and beginning at this moment the scanning starting from said scanning start frequency (k).

5. The method according to claims 1 or 3, wherein said phase to deduct in each radio fixed part (RFP) and/or in each portable part (PP) said primary receiver scan carrier number information (PSCN) from said Multiframe number information received by said at least one central control fixed part (CCFP) further comprising:

calculating the ratio 160*(MFN-Z)/(10 * N) where MFN indicates the value of the multiframe number received from said at least one central control fixed part (CCFP) and N indicates the number of radio supported frequencies;

adding the first decimal figure R resulting from said ratio to the value x of said scanning start frequency, identifying the frequency at present in scanning phase R+x;

starting immediately the radio scanning beginning in growing order from the frequency at present in the scanning phase R+x;

assigning to said information of the primary receiver scan carrier number (PSCN) present in a processing phase the value: R+x+1.

6. A personal telephone system for acquiring the number of carrier scanned by the receiver in the next TDMA frame comprising:

means for transmitting to all radio fixed parts (RFP) the initial value (z) of a multiframe number (MFN) and a corresponding scanning start frequency (x);

means for defining all radio fixed parts (RFP) the number of the supported frequencies;

means for deducting in at least one said radio fixed part (RFP) said primary receiver scan carrier number (PSCN) from the said information of multiframe number (MFN) and begin the scanning of frequencies starting from said scanning start frequency (x) and go on from frame to frame in a growing sequence.

7. The system according to claim 6, wherein at least one central control fixed part (CCFP) is effective to supply to said at least one radio fixed part (RFP) said multiframe number (MFN) information expressed as modulo of the minimum common multiple between $2^{24}$ and N.

8. The system according to claims 6 or 7, wherein said number N of the supported frequencies and subjected to scanning is a sub-multiple of $2^{24}$, and that said portable parts (PP) include means for deducting the primary receiver scan carrier number (PSCN) from the multiframe number (MFN) information received by said at least one radio fixed part (RFP).

9. The system according to claim 6 wherein said at least one radio fixed part (RFP) and/or in said portable part (PP), said means for deducting the primary scan receiver carrier number (PSCN) from said multiframe number (MFN) information includes:

means for calculating a minimum common multiple between the duration of said multiframe (160 ms) and the period which is necessary for a complete scanning of the frequencies by a radio fixed transceiver station;

means for dividing the minimum common multiple for the duration of one multiframe to get a periodicity value;

means for awaiting the multiframe number (MFN) to assume a whole multiple value of said periodicity and to start at this moment the scanning beginning at said scanning start frequency (x).

10. The system according to claim 6 wherein said at least one radio fixed part (RFP) and/or in said portable parts (PP), said means for deducting said primary receiver scan carder number information (PSCN) from said multiframe number information are including:

means for calculating the ratio 160*(MFN-Z)/(10 * N) where MFN indicates the value of the multiframe number received by the fixed transceiver station (RFP) and N indicates the number of the radio supported frequencies;

means for adding the first decimal figure resulting from said ratio to the value x of the scanning start frequency, identifying in this way the frequency in scanning phase R+x;

means for starting immediately the radio scanning, beginning in growing order from the frequency at present in scanning phase R+x;

means for assigning to the information of the primary receiver scan carrier number (PSCN), at present in processing phase, the value: R+x+1.

11. The system according to claim 8, wherein said at least one radio fixed part (RFP) and/or in said portable part (PP), said means for deducting the primary scan receiver carrier number (PSCN) from said multiframe number (MFN) information includes:

means for calculating a minimum common multiple between the duration of said multiframe (160 ms) and the period which is necessary for a complete scanning of the frequencies by a radio fixed transceiver station;

means for dividing the minimum common multiple for the duration of one multiframe to get a periodicity value;

means for awaiting the multiframe number (MFN) to assume a whole multiple value of said periodicity and to start at this moment the scanning beginning at said scanning start frequency (x).

12. The system according to claim 8, wherein said at least one radio fixed part (RFP) and/or in said portable parts (PP), said means for deducting said primary receiver scan carder number information (PSCN) from said multiframe number information are including:

means for calculating the ratio 160*(MFN-Z)/(10 * N) where MFN indicates the value of the multiframe number received by the fixed transceiver station (RFP) and N indicates the number of the radio supported frequencies;

means for adding the first decimal figure resulting from said ratio to the value x of the scanning start frequency, identifying in this way the frequency in scanning phase R+x;

means for starting immediately the radio scanning, beginning in growing order from the frequency at present in scanning phase R+x;

means for assigning to the information of the primary receiver scan carrier number (PSCN), at present in processing phase, the value: R+x+1.

* * * * *